No. 766,489. PATENTED AUG. 2, 1904.
A. G. H. BOSTELMANN.
GRAIN WEIGHING AND BAGGING SCALE.
APPLICATION FILED APR. 4, 1904.
NO MODEL.
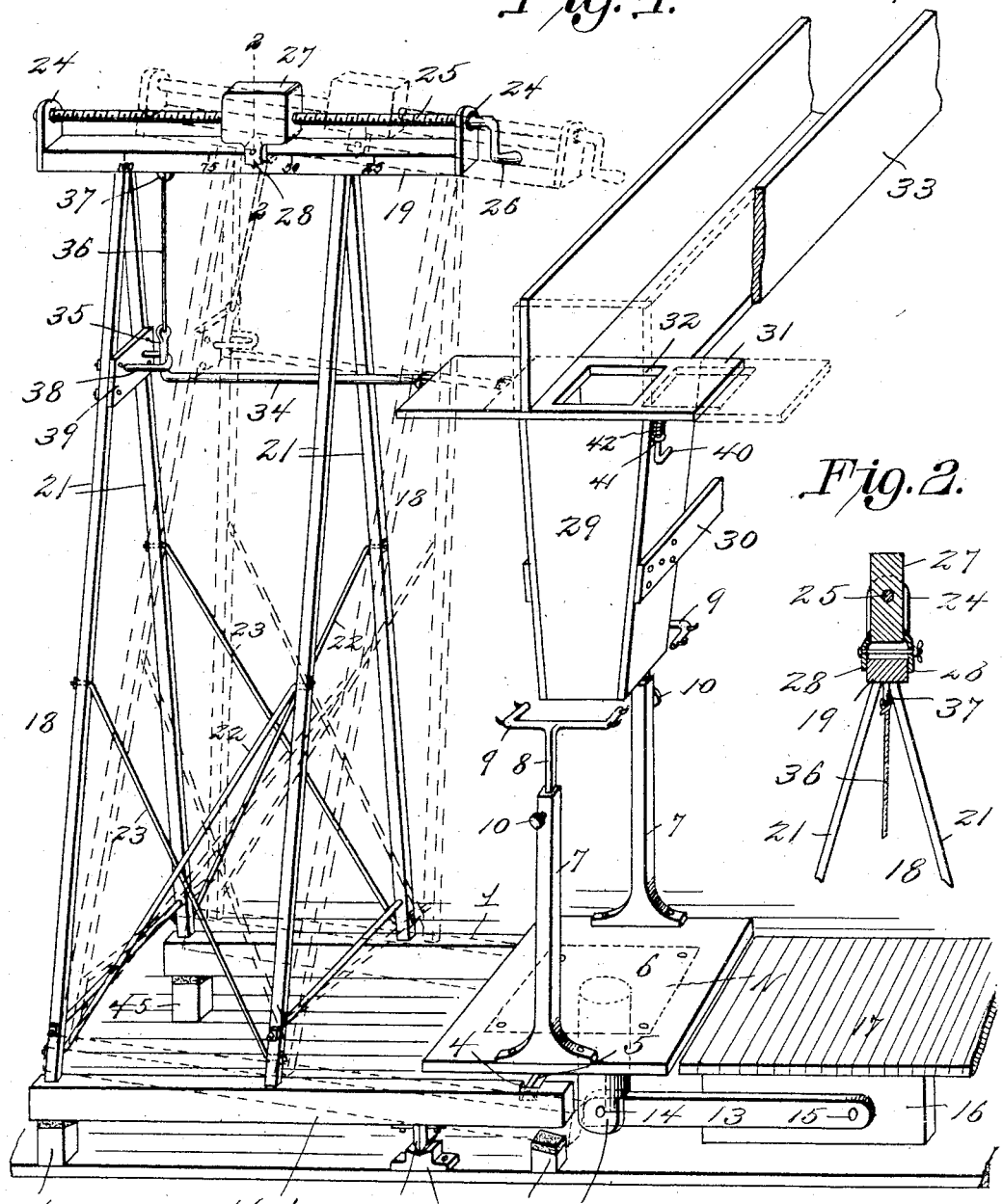
Fig. 1.
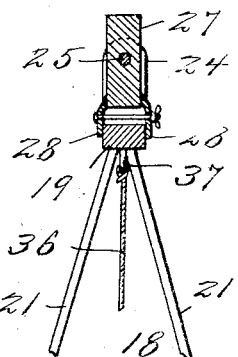
Fig. 2.
Fig. 3.
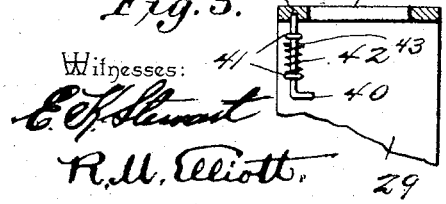
Witnesses:
E. F. Stewart
R. M. Elliott
August G. H. Bostelmann, Inventor,
by C. A. Snow & Co.
Attorneys.

No. 766,489. Patented August 2, 1904.

UNITED STATES PATENT OFFICE.

AUGUST GEORGE HERRMAN BOSTELMANN, OF FAIROAKS, ARKANSAS.

GRAIN WEIGHING AND BAGGING SCALE.

SPECIFICATION forming part of Letters Patent No. 766,489, dated August 2, 1904.

Application filed April 4, 1904. Serial No. 201,568. (No model.)

*To all whom it may concern:*

Be it known that I, AUGUST GEORGE HERRMAN BOSTELMANN, a citizen of the United States, residing at Fairoaks, in the county of Cross and State of Arkansas, have invented a new and useful Grain Weighing and Bagging Scale, of which the following is a specification.

This invention relates generally to automatic weighing-scales, and particularly to a novel form of grain weighing and bagging scales.

The object of the invention is in a ready, certain, positive, and feasible manner to cause the weight of the grain or other material fed to the sack to effect tilting of the scale-beam and its appurtenances and to utilize this tilting movement to cut off the feed of material to the bag when the exact amount has been weighed; furthermore, to secure the maximum leverage or power upon the tilting of the scale-beam to operate the grain-cut-off mechanism, thus to secure a positively-operating device which under all conditions of use may be relied upon for doing effective and accurate work.

With the above and other objects in view, as will appear as the nature of the invention is better understood, the same consists in the novel construction and combination of parts of a grain weighing and bagging scale, as will be hereinafter fully described and claimed.

In the accompanying drawings, forming a part of this specification, and in which like characters of reference indicate corresponding parts, there is illustrated one form of embodiment of the invention capable of carrying the same into practical operation, it being understood that the elements therein exhibited may be varied or changed as to shape, proportion, and exact manner of assemblage without departing from the spirit thereof, and in these drawings—

Figure 1 is a view in perspective of a grain weighing and bagging scale embodying the features of the present invention. Fig. 2 is a sectional detail view of a part of the apparatus. Fig. 3 is a detail view of a portion of the apparatus.

The scale comprises a pair of scale-beams 1, to the under side of each of which is secured a knife-blade fulcrum 2, which works in appropriate bearings 3, secured to any suitable support, in this instance to the flooring of the room in which the scale is placed. The front end of each of the scale-beams or that end nearest the operator is provided with a recess 4, (one only being shown in this instance,) in which is seated a knife-blade bearing 5 to support a platform 6, which, as usual, is provided for the purpose of supporting the lower end of the bag to be filled. Secured to the upper side of the platform and at opposite ends thereof are two standards 7, which are preferably tubular in form and receive the shanks 8 of the bag-holders 9, a set-screw 10 serving to clamp the bag-holders at any desired adjustment.

To the under side of the platform is secured a plate 11, from which depends a stud or boss 12, the same being disposed centrally of the platform and has its lower end bifurcated to receive one end of the link 13, which is held within the bifurcation by a pivot-pin 14, the other end of the link being pivoted at 15 to a block or the like 16, secured to the under side of a supplemental floor 17, which is provided for the purpose of housing the lower operative parts of the scale, the supplemental floor being provided with an opening in which the platform of the scale will work. The link 13 is provided, as usual with all scales, for the purpose of preventing the platform from tilting and also to guide it in a horizontal plane when raising or lowering.

Supported upon the outer ends of the scale-beams is a superstructure 18, which supports at its upper end a graduated scale-beam 19, the beam being rigid with the superstructure. The superstructure is, in effect, a skeleton frame and comprises four uprights 21, the adjacent pairs of which converge toward their upper ends and are secured to graduated scale-beam 19. The uprights are connected at their lower ends in any suitable manner with the scale-beams 1 and are braced against spreading and yielding in use by transverse braces 22 and cross-braces 23, and of these braces there may be employed any number that may be found necessary or desirable.

The graduated scale-beam 19 carries at each end the arm or bracket 24, and in the two brackets is mounted for rotary movement a screw 25, one end of which is provided with a crank 26 to facilitate its turning. Upon the screw is mounted the usual counterweight 27, the lower or under side of which is provided with a pair of legs 28 to straddle the beam 19, and thus hold the weight from turning under the rotations of the screw, where the said weight is shifted to adjust the scale for weighing any desired amount.

Arranged above the bag-holders is a hopper or spout 29, supported in any suitable manner, as by arms 30. Working upon the upper face of the hopper is a cut-off 31, having an opening 32, through which the grain or other material is fed to the hopper, in this instance from a conveyer 33, which may lead to any suitable source of supply. To facilitate an understanding of the construction and operation of the cut-off, one side of the conveyer is broken away, and the end is removed.

Connecting with the rear end of the cut-off is one end of a rod 34, the other end of which is bent to form an arm 35, disposed approximately at right angles to the length of the rod, the upper end of the arm having an eye to receive one end of a piece of wire 36, the other end of which is connected at 37 with the under side of the scale-beam 19. The arm 35 projects through a staple 38, carried by a plate 39 below or otherwise secured to two of the uprights 21. The staple will be of such length as to permit a slight tilting of the superstructure before inward movement is imparted to the cut-off, in this instance about two inches, this arrangement being adopted in order that the overweight on the scale will be effective in tilting the superstructure with sufficient force as to cause it positively to actuate the cut-off, and to cause this result to be positive it is essential that there be no frictional contact between the rod and the staple 38, and this is secured by suspending the free end of the rod by the wire 36.

Of course as in devices of this character commonly in use the counterweight 27 is not set at the point on the scale indicating the amount to be weighed, but at a point indicating some pounds short of this mark in order that after the cut-off has been actuated the grain remaining in the hopper or spout will just be sufficient to cause the exact weight of grain to be fed to the bag. This being understood, the operation of the scale is as follows: The parts being in the position shown in the drawings, the grain or other material is fed to the hopper or spout, down which it escapes to a bag (not shown) which is held in position under the hopper by the bag-holders. As soon as a predetermined weight of grain is passed to the bag the platform descends, and thus lifts the superstructure, which will be tilted toward the hopper, its first tilting movement not causing any change of position of the cut-off by reason of the lost motion permitted by the length of the staple 38; but as soon as the superstructure has moved through an arc sufficient to cause the plate 39 to contact with the arm 35 of the rod the cut-off is actuated and closes ingress of grain to the hopper. Of course during the closing movement of the cut-off there will some grain pass to the hopper, and this will just be sufficient to cause the bag to receive its exact weight by the time the cut-off is entirely closed. To prevent retraction of the cut-off until a fresh bag has been placed upon the platform, a self-acting latch 40 is provided, which interlocks with a recess on the under side of the cut-off. This latch (shown in detail in Fig. 3) comprises an ordinary L-shaped bolt, guided for movement upon the hopper by keepers 41. Mounted upon the bolt between the keepers is a coiled spring 42, which bears at its upper end upon a pin 43, passing through the bolt. It will be seen by this arrangement that the normal tendency of the bolt is to engage with the under side of the cut-off, and when the latter is moved to the position shown by dotted lines in Fig. 1 the bolt will engage a recess 44 in the under side of the cut-off, and thus hold it locked until released by the attendant. When a bag is in position upon the bag-holders and the operator is ready to proceed, he releases the latch from the engagement of the cut-off, whereupon the parts will resume their normal position or that shown by full lines in the drawings. In order to limit the desired movement of the scale-beams in both directions, buffers or bump-locks 45 are provided, the upper face of which are by preference covered with rubber to lessen the shock of impact between them and the scale-beams.

By disposing the counterweight at a plane some distance above that of the cut-off the force of the thrust of the rod or connection 34 is increased, on the same principle that a long lever is more powerful in its lifting action than a short lever, and by this disposition of the counterweight positive actuation of the cut-off is secured.

The superstructure herein shown is found to be thoroughly efficient for the purpose designed; but it is to be understood that the invention is not to be limited to the exact arrangement of parts shown, as these may be widely varied or wholly changed and still be within the scope of the invention.

Having thus fully described my invention, what I claim is—

1. In a scale of the class described, a platform carrying bag-supporting means, a hopper or spout having a cut-off, a superstructure mounted upon the scale-beams and supporting a graduated scale-beam, and a connection between the superstructure and the cut-off.

2. In a scale of the class described, a platform carrying bag-supporting means, a hopper having a cut-off, a superstructure carried by the scale-beams and supporting a graduated scale-beam disposed in a plane above the hopper, and a connection between the cut-off and the superstructure.

3. In a scale of the class described, a platform carrying bag-supporting means, a hopper having a cut-off, a superstructure carried by the scale-beams and supporting a graduated scale-beam disposed in a plane above the hopper, a connection between the cut-off and the superstructure, and means for permitting the limited movement of the superstructure before actuating the cut-off.

4. In a scale of the class described, a platform, a hopper arranged above the platform and having a cut-off, a graduated scale-beam supported from the scale-beams proper on a plane above that of the cut-off, and a connection between the cut-off and the graduated scale-beam.

5. In a scale of the class described, a platform, a hopper or spout, a cut-off coacting therewith, a graduated scale-beam supported by the scale-beams proper on a plane above that of the cut-off, a cut-off actuator, and a yieldable connection between the cut-off actuator and the graduated scale-beam.

6. In a scale of the class described, a platform, a hopper having a cut-off, a superstructure carried by the scale-beams proper, a graduated scale-beam, a counterweighting mechanism supported by the upper portion of the superstructure, a rod connected at one end with the cut-off and having its opposite end formed into an arm arranged at right angles to the length of the rod, a staple carried by the superstructure and through which the arm projects, and a flexible connection between the arm and the graduated scale-beam.

7. In a scale of the class described, a platform carrying bag-supporting means, a hopper or spout having a cut-off, a superstructure mounted upon the scale-beams and supporting a graduated scale-beam, a connection between the superstructure and the cut-off, and self-acting locking means coacting with the cut-off.

8. In a scale of the class described, a hopper or spout, a cut-off coacting therewith, a graduated scale-beam supported by the scale-beams proper on a plane above that of the cut-off, a cut-off actuator, and a yieldable connection between the cut-off actuator and the graduated scale-beam.

9. In a scale of the class described, a hopper or spout, a cut-off coacting therewith, a graduated scale-beam supported by the scale-beams proper on a plane above that of the cut-off, a cut-off actuator, a yieldable connection between the cut-off actuator and the graduated scale-beam, and means to permit the graduated scale-beam to have a predetermined range of movement before affecting the said actuator.

10. In a scale of the class described, a hopper having a cut-off, automatically-operating locking means coacting therewith to hold the cut-off normally closed, a superstructure carried by the scale-beams proper, a graduated scale-beam, counterweighting mechanism supported by the upper portion of the superstructure and coacting with the graduated scale-beam, a rod connected at one end with the cut-off and having its opposite end formed into an arm arranged at right angles to the length of the rod, a staple carried by the superstructure and through which the arm projects, and a flexible connection between the arm and the graduated scale-beam.

In testimony that I claim the foregoing as my own I have hereto affixed my signature in the presence of two witnesses.

AUGUST GEORGE HERRMAN BOSTELMANN.

Witnesses:
   Thos. P. Cook,
   E. B. Case Lee.